United States Patent
Hecht

(10) Patent No.: US 11,328,350 B1
(45) Date of Patent: May 10, 2022

(54) SYSTEMS AND METHODS FOR PAYEE IDENTIFICATION VIA CAMERA

(71) Applicant: Wells Fargo Bank, N.A., San Francisco, CA (US)

(72) Inventor: Al Hecht, Chanhassen, MN (US)

(73) Assignee: Wells Fargo Bank, N. A., San Francisco, CA (US)

( * ) Notice: Subject to any disclaimer, the term of this patent is extended or adjusted under 35 U.S.C. 154(b) by 93 days.

(21) Appl. No.: 15/864,882

(22) Filed: Jan. 8, 2018

Related U.S. Application Data

(63) Continuation of application No. 14/734,694, filed on Jun. 9, 2015, now Pat. No. 11,100,571.

(60) Provisional application No. 62/010,303, filed on Jun. 10, 2014.

(51) Int. Cl.
*G06Q 40/02* (2012.01)
*G06K 9/18* (2006.01)
*G06Q 20/14* (2012.01)

(52) U.S. Cl.
CPC .............. *G06Q 40/02* (2013.01); *G06K 9/18* (2013.01); *G06Q 20/14* (2013.01)

(58) Field of Classification Search
CPC ........... G06Q 40/02; G06Q 20/14; G06K 9/18
See application file for complete search history.

(56) References Cited

U.S. PATENT DOCUMENTS

| | | | |
|---|---|---|---|
| 6,173,272 B1 | 1/2001 | Thomas et al. | |
| 8,060,442 B1 * | 11/2011 | Hecht | G06Q 20/042 |
| | | | 705/35 |
| 8,326,761 B1 * | 12/2012 | Hecht | G06Q 20/042 |
| | | | 705/45 |
| 8,483,473 B2 | 7/2013 | Roach et al. | |
| 8,577,118 B2 * | 11/2013 | Nepomniachtchi | G06K 9/3275 |
| | | | 382/137 |
| 8,774,516 B2 * | 7/2014 | Amtrup | G06K 9/00469 |
| | | | 382/182 |
| 8,879,846 B2 * | 11/2014 | Amtrup | G06K 9/00442 |
| | | | 382/190 |

(Continued)

OTHER PUBLICATIONS

Ralph Gammon, "Cut the Cost of Paying Invoices," Mar. 2004, Document Imaging Report (www.documentimagingreport.com), pp. 28-32. (Year: 2004).*

(Continued)

*Primary Examiner* — Kenneth Bartley
(74) *Attorney, Agent, or Firm* — Foley & Lardner LLP

(57) ABSTRACT

A provider computing system associated with a provider institution includes a network interface configured to communicate data over a network, and a processing circuit. The processing circuit is configured to receive, by the network interface, image data from a user computing device associated with a user, the image data pertaining to a bill of a user issued by a payee, extract a first structure of computer-readable data from the image data, associate a first payee identification parameter with the first structure, determine that the first structure is stored in association with a verified payee at a payee database based on the first payee identification parameter, and in response to determining that the first structure is stored in association with the verified payee, update an account of the user to enable the user to utilize the user computing device to authorize a payment to the payee.

9 Claims, 4 Drawing Sheets

(56) References Cited

U.S. PATENT DOCUMENTS

| | | | |
|---|---|---|---|
| 8,885,229 B1* | 11/2014 | Amtrup | H04N 1/00251 |
| | | | 358/473 |
| 9,633,353 B2* | 4/2017 | Orttung | G06F 21/40 |
| 9,870,583 B2 | 1/2018 | Lee et al. | |
| 10,043,201 B2* | 8/2018 | Lacerte | G06Q 20/04 |
| 10,146,795 B2* | 12/2018 | Macciola | G06F 16/583 |
| 10,275,673 B2* | 4/2019 | Kotovich | G06K 9/036 |
| 10,509,958 B2* | 12/2019 | Kliatskine | G06K 9/00442 |
| 2005/0065893 A1* | 3/2005 | Josephson | G06Q 20/14 |
| | | | 705/64 |
| 2005/0097019 A1 | 5/2005 | Jacobs | |
| 2007/0288382 A1* | 12/2007 | Narayanan | G06Q 20/04 |
| | | | 705/45 |
| 2008/0249936 A1 | 10/2008 | Miller et al. | |
| 2009/0222381 A1 | 9/2009 | Purches et al. | |
| 2010/0078471 A1 | 4/2010 | Lin et al. | |
| 2010/0078472 A1 | 4/2010 | Lin et al. | |
| 2010/0082481 A1 | 4/2010 | Lin et al. | |
| 2010/0104171 A1* | 4/2010 | Faulkner | G06K 9/036 |
| | | | 382/137 |
| 2010/0219234 A1 | 9/2010 | Forbes | |
| 2011/0022505 A1* | 1/2011 | Kino | G06Q 30/04 |
| | | | 705/34 |
| 2011/0184822 A1 | 7/2011 | Matkovic | |
| 2011/0184868 A1* | 7/2011 | Lacerte | G06Q 20/04 |
| | | | 705/45 |
| 2011/0276479 A1 | 11/2011 | Thomas | |
| 2012/0006891 A1 | 1/2012 | Zhou et al. | |
| 2012/0036065 A1 | 2/2012 | Orttung et al. | |
| 2012/0084162 A1 | 4/2012 | Smith et al. | |
| 2012/0089509 A1* | 4/2012 | Kasriel | G06Q 20/102 |
| | | | 705/40 |
| 2012/0116972 A1 | 5/2012 | Walker | |
| 2012/0136781 A1 | 5/2012 | Fridman et al. | |
| 2012/0158589 A1 | 6/2012 | Katzin et al. | |
| 2012/0265655 A1 | 10/2012 | Stroh | |
| 2012/0267432 A1 | 10/2012 | Kuttuva | |
| 2013/0018794 A1* | 1/2013 | Ungerland, II | G06Q 20/3274 |
| | | | 705/44 |
| 2013/0022231 A1* | 1/2013 | Nepomniachtchi | G06Q 20/042 |
| | | | 382/102 |
| 2013/0030964 A1 | 1/2013 | Nuzzi et al. | |
| 2013/0054459 A1 | 2/2013 | Granbery | |
| 2013/0204756 A1 | 8/2013 | Orttung et al. | |
| 2013/0290176 A1 | 10/2013 | Tirumalashetty | |
| 2014/0006184 A1 | 1/2014 | Godsey | |
| 2014/0079294 A1* | 3/2014 | Amtrup | G06K 9/00469 |
| | | | 382/112 |
| 2014/0108456 A1 | 4/2014 | Ramachandrula et al. | |
| 2014/0143136 A1 | 5/2014 | Dhar et al. | |
| 2014/0153830 A1* | 6/2014 | Amtrup | G06K 9/00442 |
| | | | 382/190 |
| 2014/0188715 A1 | 7/2014 | Barlok et al. | |
| 2014/0236790 A1 | 8/2014 | Smith et al. | |
| 2014/0236791 A1 | 8/2014 | Palmer et al. | |
| 2014/0237352 A1 | 8/2014 | Sriganesh et al. | |
| 2014/0244490 A1 | 8/2014 | Miller et al. | |
| 2014/0244493 A1 | 8/2014 | Kenyon et al. | |
| 2014/0270461 A1 | 9/2014 | Narendra et al. | |
| 2014/0279303 A1 | 9/2014 | Van Dam et al. | |
| 2014/0279453 A1 | 9/2014 | Belchee et al. | |
| 2015/0032636 A1 | 1/2015 | Wedekind et al. | |
| 2015/0106196 A1 | 4/2015 | Williams et al. | |
| 2015/0120516 A1 | 4/2015 | Smith et al. | |
| 2015/0170118 A1 | 6/2015 | Finley | |
| 2015/0339318 A1 | 11/2015 | O'Toole et al. | |
| 2016/0012526 A1* | 1/2016 | Kasriel | G06Q 40/00 |
| | | | 705/51 |
| 2017/0270508 A1* | 9/2017 | Roach | G06K 9/3275 |

OTHER PUBLICATIONS

David Kosiba et al., "Automatic Invoice Interpretation: Invoice Structure Analysis," 1996 IEEE Proceedings of ICPR '96, pp. 721-725 (Year: 1996).

Ming Delie, The Design and Implementation of a Chinese Financial Invoice Recognition System, 2002, IEEE, pp. 117-122 (Year: 2002).

* cited by examiner

SYSTEMS AND METHODS FOR PAYEE IDENTIFICATION VIA CAMERA

CROSS-REFERENCE TO RELATED APPLICATIONS

This application is a continuation of U.S. patent application Ser. No. 14/734,694, titled "SYSTEMS AND METHODS FOR PAYEE IDENTIFICATION VIA CAMERA," filed on Jun. 9, 2015, which claims the benefit of priority to U.S. Provisional Patent Application Ser. No. 62/010,303, titled "SYSTEMS AND METHODS FOR PAYEE IDENTIFICATION VIA CAMERA," filed on Jun. 10, 2014, each of which are herein incorporated by reference in their entirety and for all purposes.

BACKGROUND

Many financial institutions, such as banks, allow customers to access and manage their accounts via the internet and via applications running on internet-enabled devices (e.g., smartphones, tablets, etc.). Through the applications, customers can often view account balances, transfer funds between accounts, and deposit checks. For example, to deposit a check into an associated account, the customer takes pictures of the front and back of the check via the financial institution application, and the financial institution recognizes the necessary information to process the check (e.g., routing number, account number, payee's information, amount, etc.). Depositing a check via a camera is a simple task for customers in part because all checks generally include the same information, have the same size, and are a single piece of paper.

Additionally, customers can pay bills such as cable and utility bills via the financial institution applications. The customers can associate authorized payees, such as the cable company or the utility company, with their account. Associating an authorized payee with a customer account often requires that the customer manually input payee information, such as company name, address, and company contact information. Then, the customers can authorize the bank to either transfer funds of the customer to an account of the payee or to send payment, such as a check, to the payee to satisfy a bill from the payee.

SUMMARY

One exemplary embodiment relates to a method of adding a payee to a customer account by a computing system of a financial institution, the computing system including a processor and a memory. The method includes receiving, at the processor, image data relating to a bill issued by a payee. The method includes performing, by the processor, optical character recognition of the image data. The method further includes extracting, by the processor, a plurality of blocks of text from the image data. The method includes comparing, by the processor, a first block of text of the image data to a database of known payees, wherein the first block of text relates to a name of the payee. The method further includes identifying, by the processor, the payee from the database of known payees. The method includes associating, by the processor, the payee with the customer account.

Another exemplary embodiment relates to a banking system for associating an authorized payee with a customer account. The system includes a network interface configured to facilitate data transmission over a network. The system further includes a memory. The system includes a processor. The processor is configured to receive image data relating to a bill issued by a payee from a customer device via the network interface. The processor is further configured to perform optical character recognition of the image data. The processor is configured to extract a plurality of blocks of text from the image data. The processor is further configured to compare a first block of text of the image data to a database of known payees, wherein the first block of text relates to a name of the payee. The processor is configured to identify the payee from the database of known payees. The processor is further configured to associate the payee with the customer account.

A further exemplary embodiment relates to a non-transitory computer readable media with computer-executable instructions embodied thereon that, when executed by a processor of a financial institution computing system, cause the financial institution computing system to perform operations to add a payee to a customer account based on received image data of a bill. The process includes receiving image data relating to the bill issued by the payee and performing optical character recognition of the image data. The process further includes extracting a plurality of blocks of text from the image data. The process includes comparing a first block of text of the image data to a database of known payees, wherein the first block of text relates to a name of the payee. The process further includes identifying the payee from the database of known payees. The process includes associating the payee with the customer account.

DETAILED DESCRIPTION

Referring to the figures generally, systems and methods for adding a new payee (e.g., a biller) to an online bill pay provider are described. The new bill payee may be a utility or a service provider (e.g., a cable television company, a power utility company, an Internet provider, a telephone provider, etc.), a creditor (e.g., a credit card company, a retail store, etc.), another company, an individual, or any other entity capable of receiving payment. The online bill pay provider may be a financial institution such as a bank. Generally, the systems and methods allow a customer in receipt of a paper bill or statement (e.g., a monthly cable bill) to take a digital picture of the bill (e.g., via a smartphone camera) and to provide the digital picture to the financial institution (e.g., via a financial institution application running on the smartphone). A computing system of the financial institution then identifies the entity associated with the paper bill or statement and adds the entity as an eligible payee for the customer such that the customer can make a payment to the entity via the financial institution.

However, adding a new payee to a customer account via the camera is not as straight forward as depositing a check via the camera. Unlike a check, the bill received from a first service provider may be in an entirely different format from other bills received from other service providers. For example, the location of the company's name, the company's address, the account number, the amount of the bill, the bill due date, and the like may be arranged in different locations on the bill, or even on different pages of the bill, because there is no standard format for a bill. Accordingly, customers might not know where to focus the camera with respect to each bill (e.g., where on a page, what page of a multipage bill, etc.). The described systems and methods account for the variable information that might be received in the customer's image of the received bill.

Figure 1:
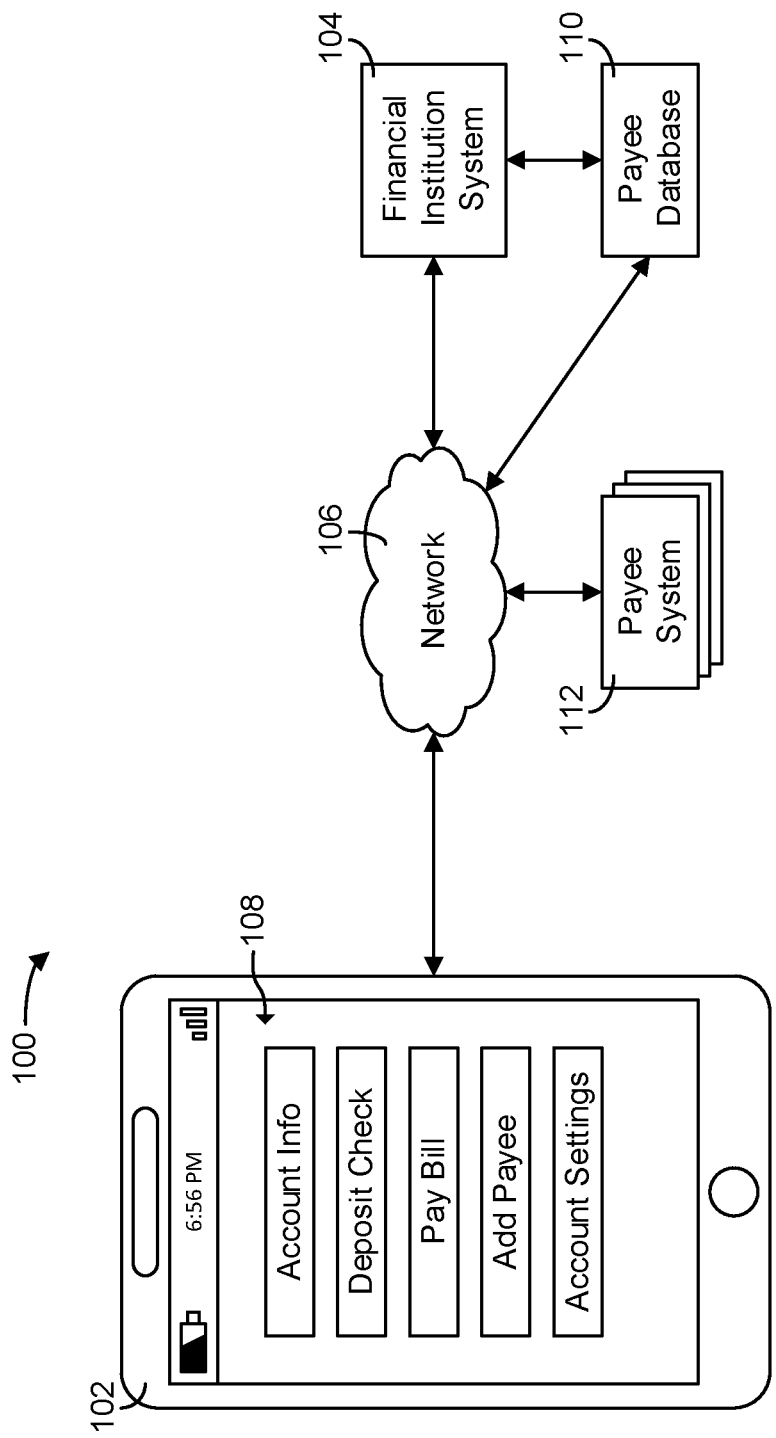
FIG. 1 is a block diagram of a system for allowing a customer to access services of a financial institution via a customer device according to an exemplary embodiment.

Referring to FIG. 1, a block diagram of a system 100 for allowing a customer to access services of a financial institution via a customer device 102 is shown according to an exemplary embodiment. The customer device 102 communicates with a financial institution system 104 through a network 106. In some arrangements, the network 106 is the Internet. The financial institution system 104 includes various computing systems of the financial institution that maintain customer account information and provide financial institution services to customers. The financial institution services may include any of deposit account services, credit account services, bill pay services, and the like. As shown in FIG. 1, the customer device 102 is a smartphone. The user device 102 communicates with the financial institution system 104 through an application 108 (e.g., a smartphone application) being executed by a processor of the user device 102. In other arrangements, the user device 102 communicates with the financial institution system 104 through a financial institution website accessed via a web browser on the user device 102. The website may provide the customer access to the same services as offered via the application 108. Although the customer device 102 is shown as a smartphone, the customer device 102 may be any of a tablet computer, a PDA, a laptop, a desktop, or any other portable computing device capable of communicating with the financial institution system 104 via the network 106. The user device 102 includes a camera for capturing digital image data (e.g., a picture of a check, a picture of a bill, etc.). The digital image data may be transmitted to the financial institution system 104 to perform various services (e.g., check deposit, user authentication, payee adds, etc.).

The application 108 running on the customer device 102 provides the customer remote access to various services offered by the financial institution. The services may include providing the customer access to the customer's account information (e.g., balances, recent transactions, etc.), allowing the customer to deposit a check by taking a picture of both sides of the check and transmitting the image data to the financial institution system 104, paying bills issued by verified payees (e.g., transferring money to a utility provider), updating account settings, and the like. In some arrangements, the customer can only authorize the financial institution to pay bills issued by verified or authorized payees. A payee may be any of a company, such as a utility or services provider, an individual, a creditor, or another entity (e.g., a condo owner's association). In some arrangements, payees are associated with customer accounts prior to allowing the customer to authorize a payment to a given payee. Accordingly, the application 108 allows the customer to add a payee. A payee may be added manually by the customer. For example, the customer may manually enter in the payee's identification, such as a company name, the payee's address, a customer account number, and other required information. Alternatively, the application 108 allows the customer to add a payee by taking a picture of a bill or invoice received from the payee and uploading the image to the financial institution system for automatic payee identification. The process of adding a payee through the camera of the user device 102 is discussed in further detail below.

The system 100 also includes a payee database 110. The payee database 110 may be maintained by the financial institution or by a third-party entity (e.g., a contractor or vendor of the financial institution). The payee database 110 communicates directly with the financial institution system 104 or indirectly via the network 106. The payee database 110 is a database of known payees (e.g., payees previously registered by customers within the financial institution system 104). The payee database 110 includes a plurality of payee entries, each entry including information relating to a single payee. The information relating to the single payee may include any of the payee name (e.g., the company name), a payee nickname, an address including the zip code, a phone number, an e-mail address, a website, and a combination thereof.

In some arrangements, the system 100 includes payee systems 112. The payee systems 112 communicate with financial institution system 104 via the network 106. The payee systems 112 receive various information, such as payment confirmation information and financial information, from the financial institution system 104. Each of the payee systems 112 may be associated with an individual payee.

Figure 2:
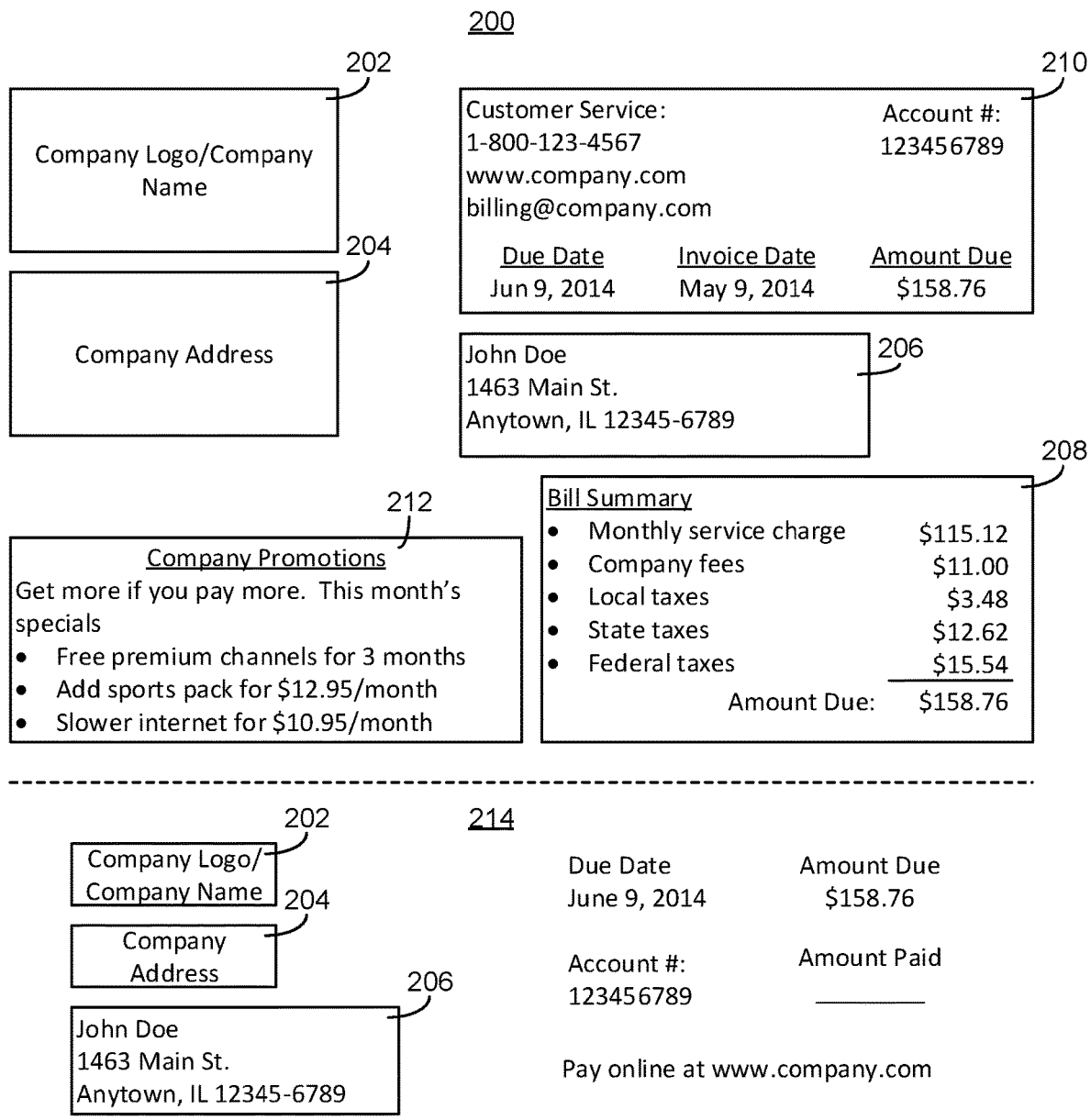
FIG. 2 is an exemplary utility bill according to an exemplary embodiment.

Referring to FIG. 2, an exemplary utility bill 200 is shown according to an exemplary embodiment. The utility bill 200 includes basic information such as the company name and/or a company logo 202, a company address 204, customer information 206, a bill summary 208, and other bill information 210. The other bill information 210 may include the company's phone number, the company's website URL, the company's e-mail address, and the like. Additionally, the bill 200 may include other information such as promotional information 212. A bottom portion of the bill 200 may include a payment coupon 214 that the customer can send directly to the payee with payment (e.g., a check). Certain information, such as the company name and/or company logo 202, the company address 204, and the customer information 206 may be repeated at various portions of the bill 200. Although shown as a single page in FIG. 2, the utility bill 200 may in fact include any number of pages detailing the charges leading up to the amount due. Further, additional inserts, such as promotional material, may be received by the customer with the bill.

Bills from different payees may have different arrangements of information from that of bill 200. Because bills are not in a universally standardized format across companies and payees, customers may not know what information to capture with the camera of the customer device 102 when the customer is attempting to add a payee. For example, while attempting to add a payee via the camera of the customer device 102, a customer may focus the camera to capture the payment coupon 214 of the bill 200. Another customer, while attempting to add the same payee via the camera of the customer device 102, may focus the camera to capture the top half of the bill 200. Yet another customer may focus just on the company information, such as the company logo 202 and the company address 204. Accordingly, the financial institution system 104 is capable of identifying and matching payees to captured portions of the bill 200 containing different information. Accordingly, the financial institution system 104 is configured to identify payees based on non-standard (e.g., variable) image data received from a plurality of customers.

Figure 3:
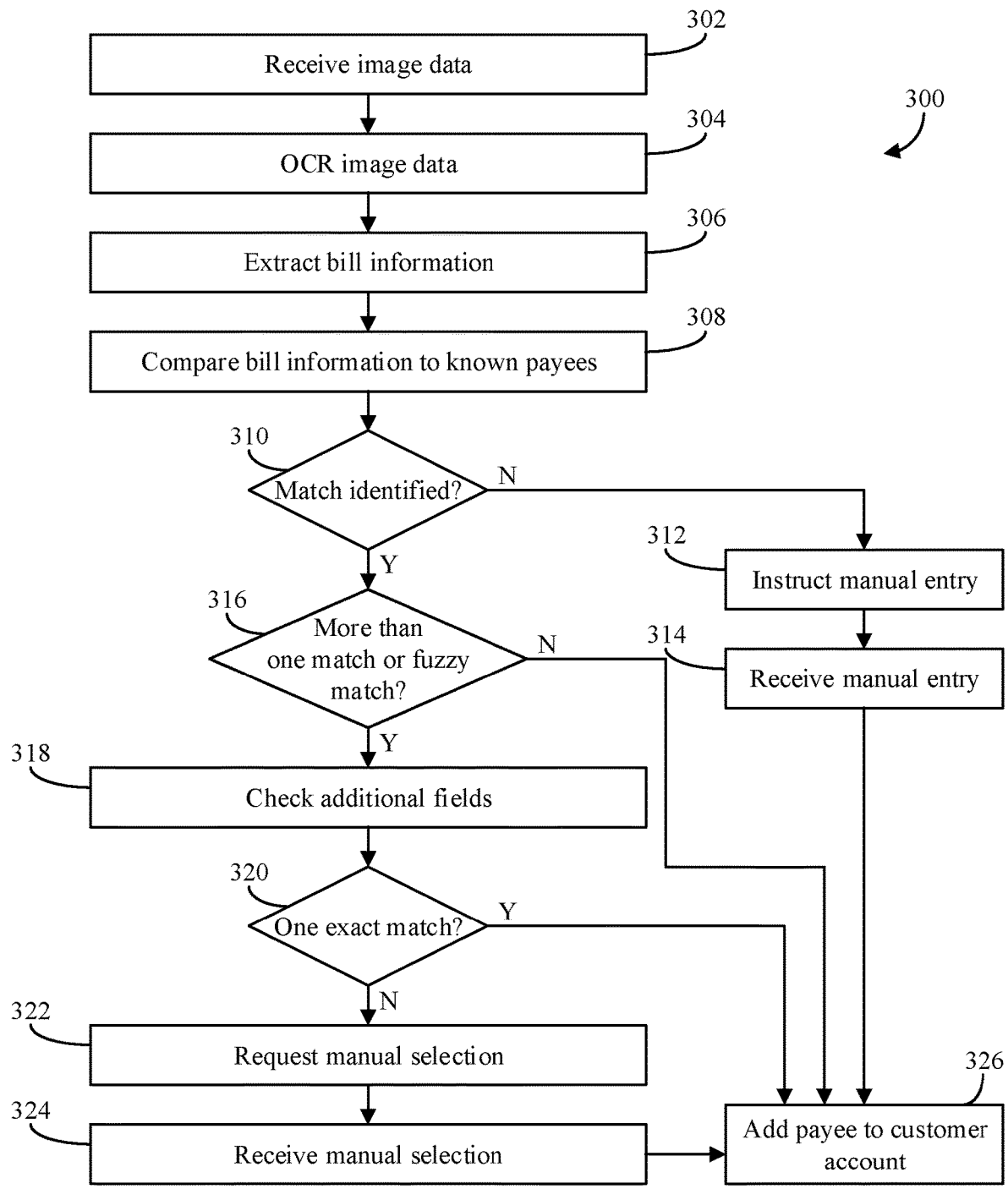
FIG. 3 is a flow diagram of a method of adding a payee to a customer account according to an exemplary embodiment.

Referring to FIG. 3, a flow diagram of a method 300 of adding a payee to a customer account is shown according to an exemplary embodiment. The steps of the method are performed by a processor of a financial institution computing system (e.g., financial institution system 104). The financial institution computing system includes a processor, a memory, and a communication interface. The financial institution computing system is in communication with a customer device (e.g., customer device 102) operated by an account holder with the financial institution. The financial institution computing system communicates with the customer device via the communication interface and a network, such as the Internet. The customer device is executing a financial institution application (e.g., application 108) that allows the customer to access services provided by the financial institution remotely via the financial institution computing system.

Method 300 begins when image data relating to a bill from a payee is received at 302. The image data relating to the bill is captured by a camera of the customer device. The image data generally relates to a picture of a bill received by the customer. The bill is issued by a payee that the customer wishes to add or associate to his or her account with the financial institution. As described above, the image data relating to the bill may vary each time because of both the varying bill format from payee to payee and each customer's preferred picture area of the bills. For example, the image data from the customer may exclude certain portions of the bill helpful in identifying the payee (e.g., the payee name, the payee address, etc.) The customer device transmits the image data to the financial institution computing system where it is received by the processor. In some arrangements, the customer device transmits the image data to the financial institution computing system via the financial institution application. In other arrangements, the customer device transmits the image data to the financial institution computing system via a website for the financial institution. In further arrangements, the customer device transmits the image data to the financial institution as an attachment to an e-mail sent to an financial institution e-mail address.

Optical character recognition is performed on the image data at 304. After receiving the image data from the customer device, the financial institution computing system uses optical character recognition to transform any text (e.g., letters, numbers, symbols, etc.) into computer-readable text. For example, the picture of the bill may include text such as the payee's name, the payee's address, account numbers, account balances, payee website, payee phone number, payee e-mail address, customer contact information, and the like.

Bill information is extracted at 306. After the image data has undergone optical character recognition, blocks of computer-readable text contained on the bill are recognized by the financial institution computing system. The blocks of text may relate to any of a payee name (e.g., a formal company name, such as "Company X Telecom Services Provider, Inc."), a payee nickname (e.g., the company as known by its customers, such as "Company X"), payee address (e.g., the address may include a first line, a second line, a city, a state, a zip code, a country, a P.O. box, or a combination thereof), a phone number, an e-mail address, a website, a customer name, a customer address, an account number, an amount due, a due date, payment information, promotional information, descriptions of the charges, and other informational blocks of text. Using automated logic of the financial institution computing system, the financial institution computing system is capable of distinguishing blocks of text that relate to different information contained in the bill. For example, the financial institution computing system can identify the block of text that corresponds with the payee's name, the block of text that corresponds with the zip code of the payee's address, the payee's website, the payee's phone number, the payee's e-mail address, and so on. The blocks of text are categorized (e.g., tagged or inserted into a field of a database) based on the identified information contained within the individual blocks of text.

The extracted and identified blocks of text are compared to known payee information at 308. The known payee information is stored in a payee database (e.g., payee database 110). The payee database is maintained by the financial institution or a third party. The payee database is a database of known payees (e.g., payees previously registered by customers within the financial institution, payees preapproved by the financial institution, etc.). The payee database includes a plurality of payee entries, each entry including information relating to a single payee. The information relating to the single payee includes payee identifying data such as the payee name (e.g., a formal payee name), the payee nickname (if one is known), the payee address, a phone number, an e-mail address, a website, a customer account format, and the like. In certain arrangements, the payee address is broken down into different fields including a first line of the address, a second line of the address, a city, a state, a zip code, a country, a P.O. box, and any other applicable address field.

The individual blocks of text are compared with the individual information contained in each payee entry in the known database. The blocks of text are compared in a hierarchical order until a positive match or positive matches are identified. The blocks of text are compared on a one-off basis (e.g., one at a time) in at least one pass against the entries in the payee database in at least one pass. If the first pass is successful in identifying at least one payee, the method 300 moves on to 310. If the first pass (e.g., the pass based on the block of text identified as corresponding to the payee name) is not successful in identifying the payee in the payee database, additional passes on the other blocks of text are performed. For example, the block of text corresponding to the payee name may be compared first in time (e.g., during a first pass) to the entries in the known payee database (e.g., both the payee formal name and the payee nickname). If no match is located based on the payee name, then the payee address (or an individual part of the address, such as a zip code) may be compared second in time (e.g., during a second pass) to the entries in the known payee database, and so on until a matching payee is identified. An exemplary hierarchy of search order may be as follows (in order from highest priority to lowest priority): payee name, payee nickname, payee zip code, payee address (line 1, line 2, etc.), payee phone number, and then payee e-mail. In some situations, the comparison results in a single exact match in the known payee database. In other situations, the comparison results in a single fuzzy match in the known payee database. For example, errors that occurred during the optical character recognition at 304 may result in a partial match because of a misrecognition of a character (e.g., the interpretation of an upper case "I" as a lower case "L"). As another example, a fuzzy match may occur if the image data cuts off a portion of the payee name (e.g., the payee's name is Company X but the "Co" are cut off in the image data resulting in a text block reading "mpany X"). In these examples, the match is termed "fuzzy" because the text block is not an exact match with the entry in the database. In further situations, the comparison results in a plurality of matches—either exact or fuzzy. For example, an individual company may have multiple payee addresses, each address servicing a different geographical area or type of account (e.g., a company that provides services to multiple states may have a payment center in each state, a company that provides different types of services may have a payment center for each type of service, etc.). In still further situations, the comparison results in no matching known payee.

The financial institution computing system determines if at least one matching known payee is identified at 310. The match can be a fuzzy match or an exact match. If no matching known payee is identified from the known payee database (e.g., after exhausting all or a plurality of the extracted text blocks in comparison passes against the payee database), the customer is instructed for manual entry of the payee at 312. The financial institution computing system transmits an alert to the customer device prompting the user for manual entry of the payee. The alert may include an indication that no known payee could be identified based on the received image data. Alternatively or additionally, the alert may include the option for the customer to capture an additional image of the bill and to restart the automatic payee identification process (e.g., go back to 302). A manual entry of the payee identification is received at 314. The customer provides the manual entry of the payee identification in response to the alert received at 312. Based on receipt of the manual entry, the payee is added to the customer account at 326.

If at least one matching known payee is identified at 310, the financial institution determines if only one known payee exactly matches or if more than one known payee or at least one fuzzy known payee potentially matches the information at 316. If only one exact match exists, the payee is added to the customer account at 326. In some arrangements, the customer may be asked for confirmation that the matching payee is the intended payee. If more than one payee exactly matches or if there is at least one fuzzy match for a known payee, the financial institution computing system checks additional blocks of text against the known payee database at 318. For example, if at the first pass only the payee name was checked for matches, then the second pass would also check the payee address (or a portion of the address) against the known payee database to eliminate identified payees that do not also match with the information contained in the next block of text to be compared with the payee database. The financial institution computing system may continue making additional comparisons between the blocks of text and the known payee database until an exact match is found or until the identified text blocks are exhausted. In some arrangements where a single fuzzy match is located at 310, the single fuzzy match is added to the customer account at 326 without needing additional confirmation based on comparisons of the other blocks of text to the payee database. For example, if the block of text for the name reads "Iloyd's Body Sh0p" creates a single fuzzy match with the known payee "Lloyd's Body Shop," the payee is added because the fuzzy match exceeds a threshold match level that corresponds to a confidence of the match. The threshold match level may be based on a threshold percentage of matching characters (e.g., a 90% match), common optical character recognition errors (e.g., misidentifying a letter "O" as the number "0", misidentifying an "I" as an "L", etc.), or a combination thereof.

The financial institution computing system determines if the at least one fuzzy match or the multiple matches were narrowed down to one exact match at 320. If only one exact match exists, the payee is added to the customer account at 326. If at least one fuzzy match or more than one exact matches remains, the financial institution computing system requests that the customer select or confirm the intended payee at 322. The request may include a listing of identified possible payee matches (e.g., any fuzzy payee matches and/or exact payees matches). The customer can then provide confirmation or selection of the appropriate payee through the customer device. The financial institution computing system receives the customer selection information at 324. The payee is added to the customer account at 326. As discussed above, if the plurality of matches are narrowed down to a single fuzzy match, the single fuzzy match may be added to the customer account at 326 when the fuzzy match exceeds a threshold match level. Once the payee is added to the customer account, the customer can authorize payment of the bill to the payee via the application (e.g., the financial institution computing system can receive a payment instruction from the customer to process a payment to the payee).

Method 300, as described above, happens in substantially real time. In some arrangements, the time it takes from the receiving of the image data at 302 to adding the payee to the customer account at 326 is approximately five to eight seconds. The time from 302 to 326 may be dependent on customer response time if the financial institution needs to query the customer for additional information (e.g., selection of a payee from a listing of payees).

In addition to relying on information contained in the image data associated with the bill, the method 300 may also use data stored on the customer device. The data stored on the customer device may include a token formed when the user accessed other services (e.g., a cookie from a website). The token may include information relating to various service providers of the customer. For example, if the customer logged into a service provider website, there may be a token on the customer device indicating that the customer uses the service provider. In some arrangements, the financial institution computing system scans the customer device for these tokens and factors the tokens into the identification of the payees.

Often, when payments are submitted by customers to a payee, the customer's account number must be transmitted along with the payment. For example, as shown in payment coupon 214 portion of the utility bill of FIG. 2, the customer's account number is reprinted for submission with the payment. The utility company may utilize the customer's account number to keep track of payments in their own internal accounts database. Accordingly, the above-described systems and methods for adding the new payee can also be used to identify the account number of the customer adding the payee for future bill payments through the system 100.

Figure 4:
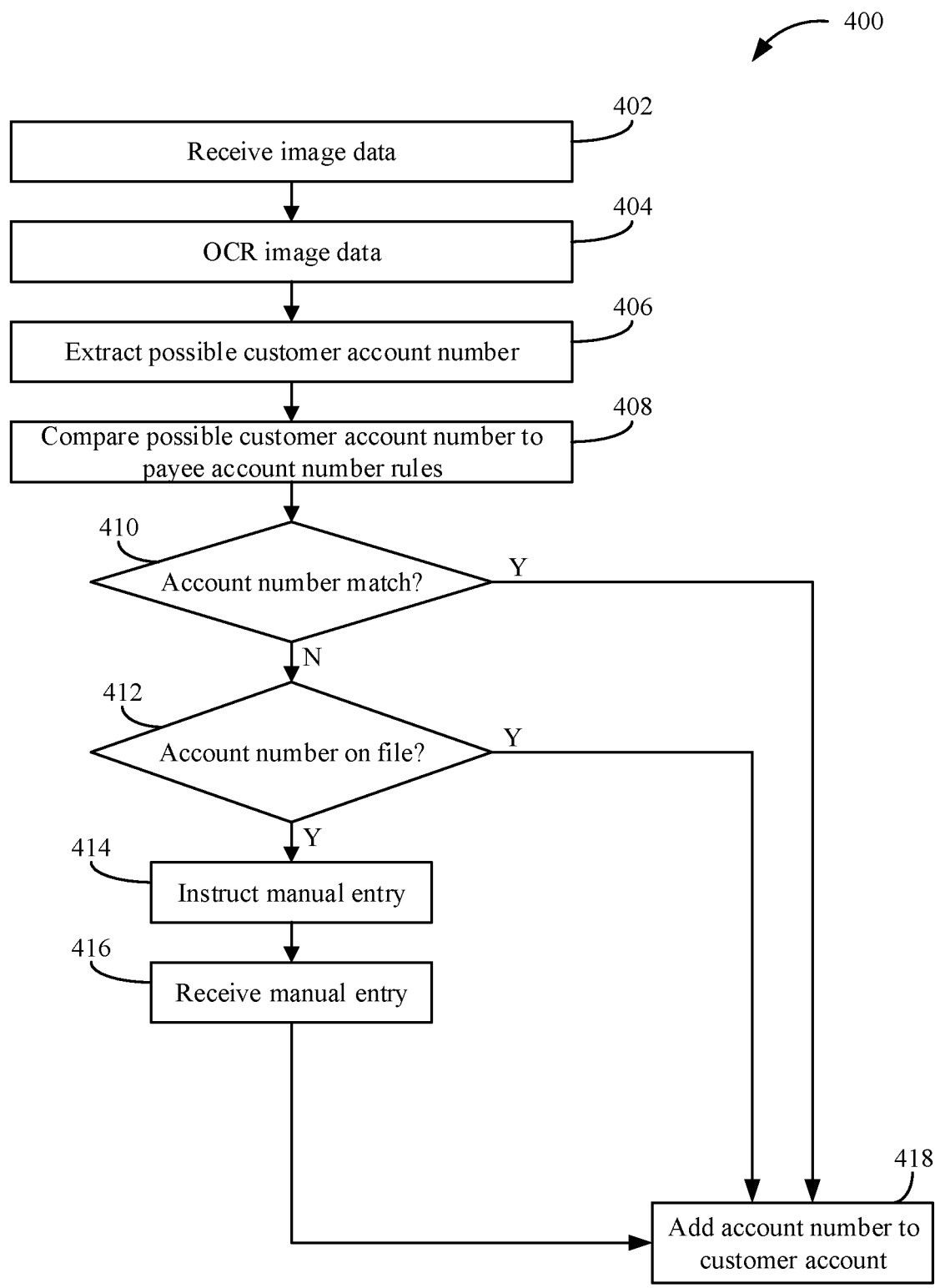
FIG. 4 is a flow diagram of a method of adding a customer account number according to an example embodiment.

Referring to FIG. 4, a method 400 of identifying and adding a customer account number is shown according to an example embodiment. In some arrangements, method 400 occurs simultaneously or immediately after method 300. In other arrangements, method 400 is performed independently of method 300. The steps of method 400 are performed by a processor of a financial institution computing system (e.g., financial institution system 104). The financial institution computing system includes a processor, a memory, and a communication interface. The financial institution computing system is in communication with a customer device (e.g., customer device 102) operated by an account holder with the financial institution. The financial institution computing system communicates with the customer device via the communication interface and a network, such as the Internet. The customer device is executing a financial institution application (e.g., application 108) that allows the customer to access services provided by the financial institution computing system remotely via the financial institution computing system.

Method 400 begins when image data relating to a bill from a payee is received at 402. The image data relating to the bill is captured by a camera of the customer device. The image data generally relates to a picture of a bill received by the customer. The bill is issued by a payee that the customer wishes to add or associate to his or her account with the financial institution (e.g., as described above with respect to method 300). As described above, the image data relating to the bill may vary each time because of both the varying bill format from payee to payee and each customer's preferred picture area of the bills. However, in addition to containing information about the payee (e.g., payee name, payee address, etc.), the image data often contains data relating to a customer account with the payee (e.g., a customer account number).

Optical character recognition is performed on the image data at 404. After receiving the image data from the customer device, the financial institution computing system uses optical character recognition to transform any text (e.g., letters, numbers, symbols, etc.) into computer-readable text. For example, the picture of the bill may include text such as the payee's name, the payee's address, customer account numbers, account balances, payee website, payee phone number, payee e-mail address, customer contact information, and the like.

A possible customer account number is extracted at 406. After the image data has undergone optical character recognition, blocks of computer-readable text contained on the bill are recognized by the financial institution computing system. The financial institution computing system recognizes that block of text (if present) that may relate to the customer's account number with the payee. Using automated logic of the financial institution computing system, the financial institution computing system is capable of distinguishing the blocks of text that relate to different information contained in the bill. For example, the financial institution computing system can identify the block of text that corresponds with the customer's account number by recognizing other key words and phrases, such as "account," "account no.," "account #," "account number," and the like, and then assuming the following block of text corresponds to the customer's account number.

The extracted and identified blocks of text are compared to known payee account number rules at 408. The known payee account number rules include formatting rules for account numbers associated with the designated payee. For example, some payees have a set account number length (e.g., 12 digits), some payees utilize both numbers and letters (e.g., two letters followed by ten digits), and so on. If the identified payee has any account number rules, the extracted possible account number is compared against the rules. In some situations, if multiple possible account numbers are identified at 406, each of the possibilities can be compared against the account number rules until a potential match is found (or not found). In such arrangements, the possible account numbers may be compared in an order of most likely to be the account number to least likely to be the account number (as determined by the logic of the financial institution computing system).

The financial institution computing system determines if a matching account number was identified at 410. The match can be a fuzzy match (e.g., if a "1" was read by the system as a lower case "L") or an exact match. If there is a fuzzy match, the financial institution evaluates the fuzzy match in the same or a similar manner as discussed above with respect to method 300. If no matching customer account number is identified, an account number database is checked to determine if the account number is on file at 412. For example, the customer may have previously paid a bill to the payee and written the account number on a check or in the notes portion of an electronic check or ACH payment from the financial institution to the payee. In such cases, the financial institution computing system can pull the stored account number. If possible customer account numbers did not match at 410, and if there is no customer account number on file at 412, the customer is instructed for manual entry of the account number at 414. The financial institution computing system transmits an alert to the customer device prompting the user for manual entry of the account number. The alert may include an indication that the account number could not be identified based on the received image data. Alternatively or additionally, the alert may include the option for the customer to capture an additional image of the bill and to restart the automatic account number identification process (e.g., go back to 402). A manual entry of the customer's account number is received at 416. The customer provides the manual entry of the payee identification in response to the alert received at 414. Based on receipt of the manual entry, the payee is added to the customer account at 418. If the system determines that there was an account number match at 410 or there was an account number on file at 412, the account number is added to the customer account at 418.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A provider computing system associated with a provider institution, the provider computing system comprising:
   a network interface configured to communicate data over a network; and
   a processing circuit, the processing circuit including a processor and a memory, wherein the memory is structured to store instructions that are executable by the processor to cause the processor to:
   receive, by the network interface, image data from a user computing device associated with a user, the image data pertaining to a bill of the user issued by a payee in a non-standardized format;
   scan the user computing device for tokens, wherein the tokens include information relating to service providers of the user based on user access of service provider websites by the user computing device;
   transform the image data in the non-standardized format into computer-readable data;
   automatically identify blocks of data from the bill of the user based on recognizing at least one of a block of text, a keyword, and a logo in the computer-readable data;
   extract a first data structure from the computer-readable data based on identified blocks of data, wherein the image data depicts a partial view of information from the bill of the user;
   associate a first payee identification parameter with the first data structure;
   extract a second data structure from the computer-readable data based on the identified blocks of data;
   associate a second payee identification parameter with the second data structure;
   compare identification information in each entry of a payee database with one or more of the data structures and tokens in a predetermined order;
   determine whether the first data structure is stored in association with a payee in the payee database based on the first payee identification parameter;
   determine, based on determining that the first data structure is not stored in association with a payee in the payee database, whether the second data structure is stored in association with a payee in the payee database based on the second payee identification parameter;

determine, responsive to determining that the first data structure is not stored in association with a payee in the payee database and that the second data structure is not stored in association with a payee in the payee database, that there are multiple entries in the payee database including text that fuzzy matches the second data structure;

identify, in response to determining that there are multiple entries in the payee database including text that fuzzy matches the second data structure, based on the scanned tokens including a token associated with a payee, the payee from the multiple entries in the payee database including text that fuzzy matches the second data structure; and add, in response to identifying the payee based on the scanned tokens from among the multiple entries in the payee database, the payee to an account of the user to enable authorization of a payment to the payee via the user computing device.

2. The provider computing system of claim 1, wherein determining whether the first data structure is stored in association with the payee includes:

determining that there is an inexact match between the first data structure and text of an entry in the payee database; and in response to determining that there is an inexact match between the first data structure and the text of the entry, comparing that a percentage of characters in the first data structure matching characters in the text of the entry to a threshold value.

3. The provider computing system of claim 1, wherein determining whether the first data structure is stored in association with the payee includes:

determining that there are multiple entries in the payee database including text that matches the first data structure; and in response to determining that there are multiple entries in the payee database including text that matches the first data structure:

extracting a third data structure of computer-readable data from the image data;

associating a third payee identification parameter with the third data structure; and based on the third payee identification parameter, identifying the third data structure as being associated with the payee.

4. The provider computing system of claim 1, wherein the payee database is maintained at the provider computing system.

5. The provider computing system of claim 1, wherein determining that there are multiple entries in the payee database including text that fuzzy matches the second data structure is based on the image data including a misrecognition of a character and a data image cut off matching at least one of the block of text, the keyword, and the logo.

6. A computer-implemented method comprising:

receiving, by a provider computing system associated with a provider institution, image data from a user computing device associated with a user, the image data pertaining to a bill of the user issued by a payee in a non-standardized format;

scanning, by the provider computing system, the user computing device for tokens, wherein the tokens include information relating to service providers of the user based on user access of service provider websites by the user computing device;

transforming the image data in the non-standardized format into computer-readable data;

automatically identifying, by the provider computing system, blocks of data from the bill of the user based on recognizing at least one of a block of text, a keyword and a logo in the computer-readable data;

extracting, by the provider computing system, a first data structure from the computer-readable data based on identified blocks of data, wherein the image data depicts a partial view of information from the bill of the user;

associating, by the provider computing system, a first payee identification parameter with the first data structure;

extracting, by the provider computing system, a second data structure from the computer-readable data based on the identified blocks of data;

associating, by the provider computing system, a second payee identification parameter with the second data structure;

comparing, by the provider computing system, identification information in each entry of a payee database with one or more of the data structures and tokens in a predetermined order;

determining, by the provider computing system, whether the first data structure is stored in association with a payee in the payee database based on the first payee identification parameter;

determining, by the provider computing system, based on determining that the first data structure is not stored in association with a payee in the payee database, whether the second data structure is stored in association with a payee in the payee database based on the second payee identification parameter;

determining, by the provider computing system and responsive to determining that the first data structure is not stored in association with a payee in the payee database and that the second data structure is not stored in association with a payee in the payee database, that there are multiple entries in the payee database including text that fuzzy matches the second data structure;

identifying, by the provider computing system, in response to determining that there are multiple entries in the payee database including text that fuzzy matches the second data structure, based on the scanned tokens including a token associated with a payee, the payee from the multiple entries in the payee database including text that fuzzy matches the second data structure; and adding, by the provider computing system, in response to identifying the payee based on the scanned tokens from among the multiple entries in the payee database, the payee to an account of the user to enable authorization of a payment to the payee via the user computing device.

7. The method of claim 6, wherein determining whether the first data structure is stored in association with the payee includes:

determining, by the provider computing system, that there is an inexact match between the first data structure and text of an entry in the payee database; and in response to determining that there is an inexact match between the first data structure and the text of the entry in the payee database, comparing a percentage of characters in the first data structure matching characters in the text of the entry to a threshold value.

8. The method of claim 6, wherein determining whether the first data structure is stored in association with the payee includes:
- determining, by the provider computing system, that there are multiple entries in the payee database including text that matches the first data structure; and
- in response to determining that there are multiple entries in the payee database including text that matches the first data structure:
    - extracting, by the provider computing system, a third data structure of computer-readable data from the image data;
    - associating, by the provider computing system, a third payee identification parameter with the third data structure; and
    - based on the third payee identification parameter, identifying, by the provider computing system, the third data structure as being associated with the payee.

9. The method of claim 6, wherein determining that there are multiple entries in the payee database including text that fuzzy matches the second data structure is based on the image data including a misrecognition of a character and a data image cut off matching at least one of the block of text, the keyword, and the logo.

* * * * *